United States Patent
Tolentino (10) Patent No.: US 8,301,925 B2
(45) Date of Patent: *Oct. 30, 2012

(54) SYSTEM AND METHOD TO ESTABLISH AND DYNAMICALLY CONTROL ENERGY CONSUMPTION IN LARGE-SCALE DATACENTERS OR IT INFRASTRUCTURES

(75) Inventor: Matthew E. Tolentino, Columbia, SC (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,432

(22) Filed: Oct. 20, 2011

(65) Prior Publication Data

US 2012/0036377 A1    Feb. 9, 2012

Related U.S. Application Data

(63) Continuation of application No. 11/966,911, filed on Dec. 28, 2007, now Pat. No. 8,069,359.

(51) Int. Cl.
*G06F 1/32* (2006.01)
(52) U.S. Cl. .................................. 713/321; 713/323
(58) Field of Classification Search .................. 713/300, 713/330, 340, 321, 323–324
See application file for complete search history.

(56) References Cited

U.S. PATENT DOCUMENTS

| | | | |
|---|---|---|---|
| 6,836,849 B2 | 12/2004 | Brock et al. | |
| 7,051,215 B2 | 5/2006 | Zimmer et al. | |
| 7,350,090 B2 | 3/2008 | Baurer et al. | |
| 7,555,666 B2 | 6/2009 | Brundridge | |
| 7,617,406 B2 | 11/2009 | Yasuo | |
| 7,779,276 B2 | 8/2010 | Bolan et al. | |
| 8,069,359 B2 * | 11/2011 | Tolentino | 713/321 |
| 2005/0044202 A1 | 2/2005 | Shirota | |
| 2005/0102544 A1 | 5/2005 | Brewer et al. | |
| 2006/0236140 A1 | 10/2006 | Tanaka | |
| 2006/0259793 A1 | 11/2006 | Moore et al. | |
| 2007/0067656 A1 | 3/2007 | Ranganathan et al. | |
| 2007/0260897 A1 | 11/2007 | Cochran et al. | |
| 2007/0300083 A1 | 12/2007 | Goodrum et al. | |

FOREIGN PATENT DOCUMENTS

| | | |
|---|---|---|
| EP | 1816544 A2 | 8/2007 |
| EP | 2075666 A2 | 7/2009 |
| GB | 2422032 A | 7/2006 |

(Continued)

OTHER PUBLICATIONS

Office Action recceived for Japanese Patent Application No. 2008-327065 mailed on Jan. 25, 2011, 2 pages of Unofficial English translaton and 2 pages of Office Action.

(Continued)

*Primary Examiner* — Raymond Phan
(74) *Attorney, Agent, or Firm* — Barnes & Thornburg, LLP (57) ABSTRACT

A system and method for establishing and dynamically controlling energy consumption in large-scale datacenters or IT infrastructures. The system including a primary configuration server, a router coupled to the primary configuration server, and a plurality of power-managed domains/clusters coupled to the router. The primary configuration server distributes an energy target to each of the power-managed domains/clusters over a predetermined interval to enable each of the power-managed domains/clusters to manage the power consumption for each of the power-managed domains/clusters to meet the energy target.

20 Claims, 7 Drawing Sheets

FOREIGN PATENT DOCUMENTS

| | | | |
|---|---|---|---|
| JP | 2005056217 | A | 3/2005 |
| JP | 2007213167 | A | 8/2007 |

OTHER PUBLICATIONS

Office Action Received for Chinese Patent Application No. 200810184730.6 mailed on Jun. 28, 2010, 4 pages of Office Action and 3 pages of Unofficial English Translation.

Office Action received for the Chinese Patent Application No. 200810184730.6, mailed on Dec. 5, 2011, 7 pages including 3 pages of English Translation.

Official Communication received for European Patent App. No. 08254170.7, mailed Apr. 25, 2012, 6 pages.

Search Report received for European Patent App. No. 08254170.7, mailed May 2, 2012, 3 pages.

Official Communication received for European Patent App. No. 08254170.7, mailed Jun. 25, 2012, 13 pages.

Office Action received for Chinese Patent App. No. 200810184730.6, mailed Jun. 4, 2012, 5 pages of Chinese Office Action and 6 pages of unofficial English translation.

\* cited by examiner

SYSTEM AND METHOD TO ESTABLISH AND DYNAMICALLY CONTROL ENERGY CONSUMPTION IN LARGE-SCALE DATACENTERS OR IT INFRASTRUCTURES

CROSS-REFERENCE TO RELATED U.S. PATENT APPLICATION

This application is a continuation application of U.S. application Ser. No. 11/966,911 entitled "SYSTEM AND METHOD TO ESTABLISH AND DYNAMICALLY CONTROL ENERGY CONSUMPTION IN LARGE-SCALE DATACENTERS OR IT INFRASTRUCTURES," which was filed on Dec. 28, 2007, now U.S. Pat. No. 8,069,359.

FIELD OF THE INVENTION

The present invention is generally related to energy consumption. More particularly, the present invention is related to a system and method to establish and dynamically control energy consumption in large-scale Information Technology (IT) datacenters or IT infrastructures.

DESCRIPTION

In large-scale IT infrastructures, as well as data centers, control over system power consumption is either fine-grained or coarse-grained. An example of fine-grained control may include using DVFS (Dynamic Voltage and Frequency Scaling) to transition processors into lower-power P-states (Processor Performance states). An example of coarse-grained control may be to turn off the entire machine or racks of machines. These approaches enable power-savings based on administrative policy at different levels, either per-component within individual platforms or in aggregate across entire infrastructures. Policies are specified centrally for heterogeneous platforms. And in power-constrained, geographical regions where a bound exists on the amount of power that can be delivered to locations that house computing infrastructures, conservative datacenters only purchase a limited number of systems based on worst-case, system power consumption projections. Naïve deployment of these types of control systems can lead to performance losses and in the worst case, high energy costs and decreased reliability.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to systems and methods for enabling networks of peer systems to be grouped to establish and manage power-centric domains and/or clusters within an overall datacenter or IT infrastructure and to dynamically achieve aggregate energy targets. Such a networked composition reduces the communication overhead dedicated to relaying power/energy targets to within a power-managed domain/cluster, and minimizes the computation necessary at management and policy coordination servers (that is, the servers that manage the servers). Instead of centrally controlling and deploying policies for heterogeneous platforms centrally, such as, for example, via multicasting or some other one-to-many network communication mechanism, energy targets are distributed to each power-managed domain/cluster based on an externally determined metric. Within each power-managed cluster, the overall energy budget is further distributed across all nodes, relegating overall achievement of the target energy budget to nodes within the cluster, where advanced component or system-level power-management techniques, such as, for example, DVFS, clock-gating, off-lining of unused hardware components, etc., may be employed.

Although embodiments of the present invention are based on large scale datacenters and IT infrastructures, the present invention is not limited to use in such large scale datacenters and IT infrastructures. Other smaller scale datacenters and IT infrastructures may also find value in grouping networks of peer systems to establish power-managed domains and/or clusters to dynamically achieve aggregate energy targets.

Embodiments of the present invention provide a multi-tiered control system that adeptly and automatically scales to changes in power-managed domain/clusters, such as, for example, systems entering and leaving networks at any time due to physical movement, catastrophic failure, etc., to optimize power/energy budget targets over predetermined, yet configurable, intervals. In other words, embodiments of the present invention enable controlling and redirecting actual power capacity by ensuring that the energy consumed by the power-managed domain/clusters never exceeds an overall targeted power/energy budget.

Figure 1:
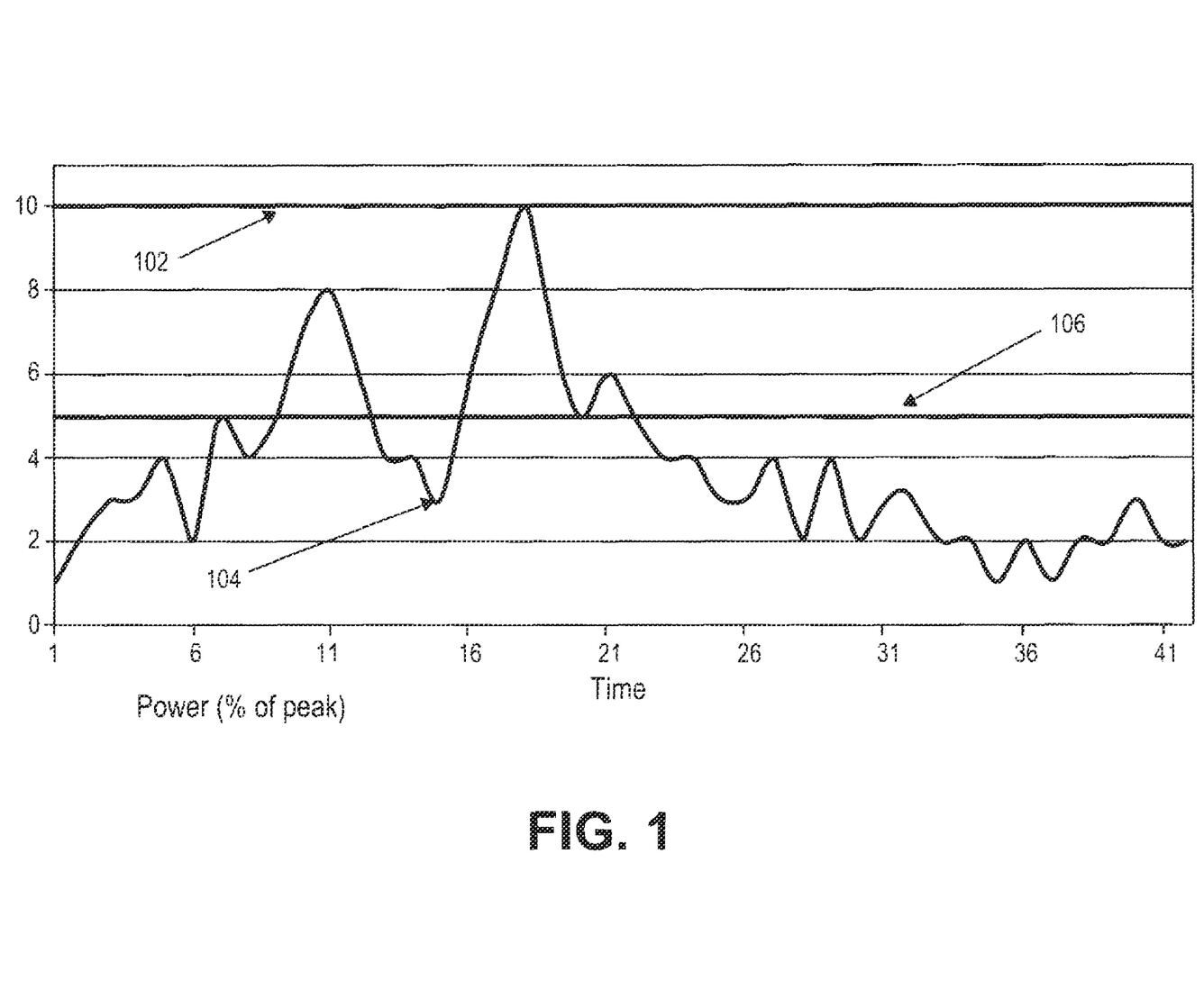
FIG. 1 is an exemplary graph illustrating percentage of peak power consumption versus time across an entire data center or IT infrastructure.

FIG. 1 is an exemplary graph 100 illustrating percentage of peak power consumption versus time across an entire data center or IT infrastructure. Graph 100 illustrates three different power consumption scenarios; peak power vs. time 102, actual power consumption vs. time 104, and target power vs. time 106. Peak power vs. time 102 is based on worst-case projections. Such projections are usually calculated as the summation of the UL (Underwriters Laboratories Inc.) nameplate ratings for all individual machines deployed in the environment. Target power vs. time 106 is configured to 50% of peak power vs. time 102. Thus, peak power vs. time 102 and target power vs. time 106 are constant over time. Actual power consumption vs. time 104 fluctuates with time. As shown in FIG. 1, the actual power consumption 104 is significantly less than the worst-case peak power 102. In fact, over a 41 minute time period, the actual power consumption 104 only reaches peak power 102 once for a time span of less than 1 minute and only exceeds target power 106 three times for a total duration of approximately 10 minutes. Thus, for approximately 30 minutes of the 41 minute time duration shown, actual power 104 is below or at target power 106 approximately 75% of the time and below peak power 102 approximately 99% of the time. Thus, given the capability to dynamically manage energy consumption across large, heterogeneous system complexes, organizations may increase the actual computational power (number and/or density of systems), yet realistically provision within a controllable energy budget.

Figure 2:
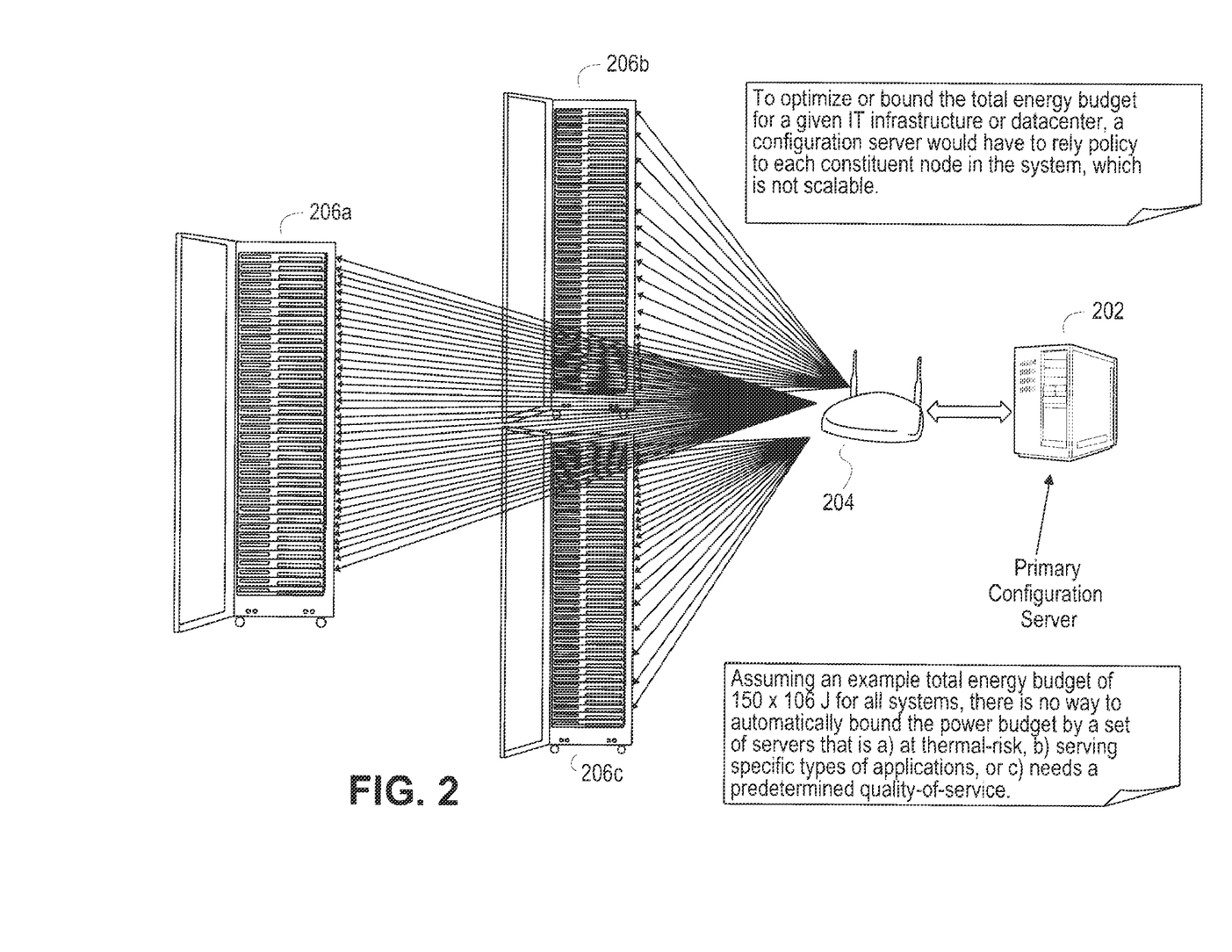
FIG. 2 is an exemplary diagram illustrating a simple model for controlling power states in current IT infrastructures and/or datacenters.

FIG. 2 is an exemplary diagram 200 illustrating a simple model for controlling power states in current IT infrastructures and/or datacenters. Diagram 200 comprises a primary configuration server 202, a router 204, and an IT infrastructure and/or datacenter comprising three systems 206a, 206b, and 206c. Primary configuration server 202 is coupled to router 204. Router 204 is coupled to systems 206a, 206b, and 206c. Although only three systems 206a, 206b, and 206c are shown in FIG. 2 for the infrastructure or datacenter, this is done for exemplary purposes only. An infrastructure or datacenter may include more than three systems or less than three systems, depending on the size of the deployed computing infrastructure or datacenter.

Primary configuration server 202 distributes power to systems 206a, 206b, and 206c via router 204 as one allocation for all three systems (206a, 206b, and 206c). Router 204 propagates the energy budget allocated for the infrastructure or datacenter to systems 206a, 206b, and 206c. Each system (206a, 206b, and 206c) comprises a rack of blade or modular servers set up in an IT infrastructure or datacenter. Each blade or modular server within each rack represents a constituent node reachable through the network via router 204 that is capable of affecting a node-level energy policy through adaptive power management techniques. Assuming an example total energy budget of $150 \times 10^6$ joules for all three sets of power-managed racks of systems 206a, 206b, and 206c, each of systems 206a, 206b, and 206c receives $50 \times 10^6$ joules, which is divided equally amongst each constituent node. With this current IT infrastructure and/or datacenter, there is no way to automatically bound the power budget by a set of servers that are: (1) at thermal risk, (2) serving specific types of applications, or (3) needing a predetermined quality-of-service. To optimize or bound the total energy budget for a given IT infrastructure or datacenter, primary configuration server 202 would have to relay policy to each constituent node in each of systems 206a, 206b, and 206c. Given the high-density of large computing environments or datacenters, such policy distribution would adversely impact network performance, particularly with high-resolution control.

Embodiments of the present invention enable dynamic management of energy consumption across large IT infrastructures or datacenters. This is accomplished by classification and control of total system power using power-managed domains/clusters. Classification and control of total system power is accomplished by clustered subsets of systems in configurable ways that are most meaningful to the environment. In other words, power/energy targets are set for each clustering subset to meet a deployment policy enforced by an organization. For example, clustering may be application-based, effectively relating aggregate realized performance to cost structure; clustering may also be based on time-of-day metrics or physical locality, particularly with respect to the thermal dissipation requirements of housing facilities.

Figure 3:
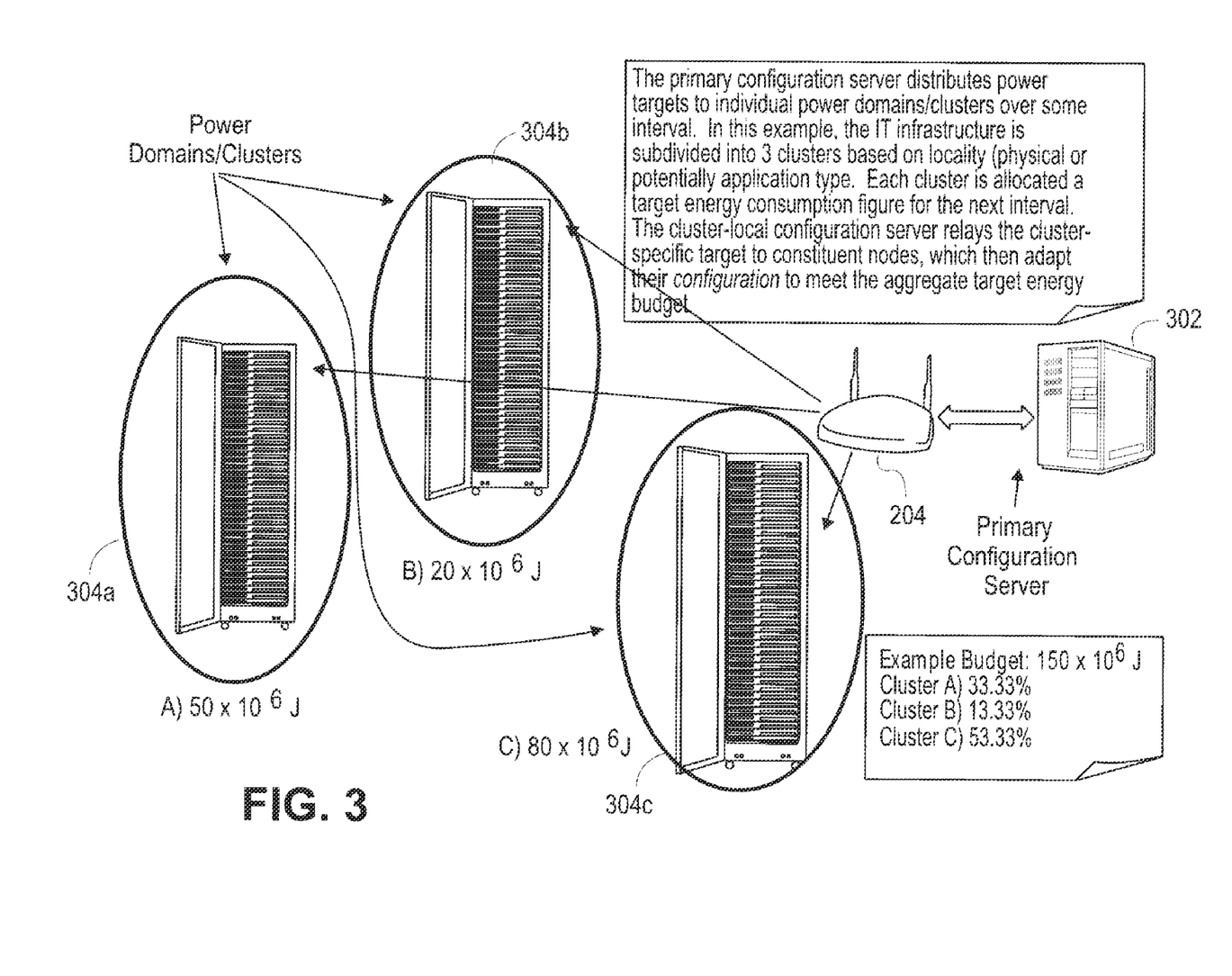
FIG. 3 is an exemplary diagram illustrating a power domain/cluster model for controlling power states according to an embodiment of the present invention.

FIG. 3 is an exemplary diagram illustrating a power domain/cluster model 300 for controlling power states according to an embodiment of the present invention. Power/cluster model 300 comprises a primary configuration server 302, router 204, and a plurality of power domains or clusters 304a, 304b, and 304c. Primary configuration server 302 is coupled to router 204. Router 204 is coupled to power-managed domains/clusters 304a, 304b, and 304c.

Primary configuration server 302 distributes power/energy targets to individual power-managed domains/clusters 304a, 304b, and 304c over a predetermined interval. As shown in FIG. 3, the IT infrastructure is subdivided into three (3) power-managed domains/clusters 304a, 304b, and 304c. For simplicity, only three power-managed domains/clusters are shown in this example. Embodiments of the present invention are not limited to three power-managed domains/clusters. In fact, for any large infrastructure, more than three power-managed domains/clusters or less than three power-managed domains/clusters may be implemented.

Power-managed domains/clusters 304a, 304b, and 304c are simply collections of machines based on locality in some context, such as, for example, physical proximity, network distance, deployment purpose, application type, etc. Power-managed domains/clusters 304a, 304b, and 304c may include, but are not limited to, racks of blade or modular servers in an infrastructure or datacenter, workstations, laptops, etc. Most systems in such environments are configured autonomously by an IT configuration server, such as, for example, primary configuration server 302, from which a local installation may be set up on individual machines, applications downloaded, configured and started. Such installation/configuration primarily occurs upon a system's entry into the infrastructure or datacenter.

Each power domain/cluster (304a, 304b, 304c) is allocated a target power/energy consumption amount for the next interval. Each power domain/cluster (304a, 304b, 304c) also has a local configuration server (not explicitly shown) that operates in a similar manner to primary configuration server 302. The local configuration servers relay the cluster-specific energy target to its constituent nodes. The constituent nodes then adapt their configuration to meet the aggregate target energy budget.

As shown in FIG. 3, different energy levels can be targeted for different power-managed domains/clusters based on application type, time-of-day metrics, physical locality, etc. For example, an overall budget of $150 \times 10^6$ joules is provided for all power domain/clusters 304a, 304b, and 304c. Primary configuration server 302 allocates energy targets to the individual power domain/clusters 304a, 304b, and 304c. In the example shown, cluster 304a is allocated an energy target of 33.33%, cluster 304b is allocated an energy target of 13.33%, and cluster 304c is allocated an energy target of 53.33% of the total targeted energy for a given interval. For example, if the infrastructure is a financial institution, cluster 304c, having the largest targeted energy allocation, may be used for stock market trading because the best performance without delays is needed to perform this task, while cluster 304b, having the smallest targeted energy allocation, may be used for market analysis, and cluster 304a, having the second largest targeted energy allocation, may be used for all other day-to-day operations. Embodiments of the present invention also enable allocations for power domain/clusters to be reconfigured. For example, since U.S. markets are closed at night, an abundance of market analysis may be performed during the night, and thus, cluster 304c may be allocated to market analysis while cluster 304b may be allocated to market trading. Also, the amount of targeted power/energy allocated to one cluster may be reduced and that unused portion may be repurposed or transitioned to another cluster or used in some other way. In this instance, instead of moving market analysis to cluster 304c, energy/power allocated to cluster 304c may be reduced and repurposed to cluster 304b at nighttime to meet the performance requirements of heavy market analysis.

Embodiments of the present invention enable power-managed domains/clusters 304a, 304b, and 304c to individually monitor their power/energy consumption dynamically, either through in-band or out-of-band baseboard management controllers (BMCs) or software monitors working in concert with individual components, such as processors, memory, network controllers, etc. through proprietary or standard interfaces, such as, for example a PMbus. Each of power domain/cluster 304a, 304b, and 304c relays it energy consumption over some configurable or predetermined interval. Each node of power domain/clusters 304a, 304b, and 304c has multiple power states, such as S-states or System states, as well as intermediate power states, such as, for example, P-states or Processor Performance states, C-states or Processor Power states, and D-states or Device states, within the S-states based on various component-specific operating levels.

S-states or System states are the power states that the system is in, such as, S0, S1, S2, S3, etc. For example, the S0 state refers to a system state in which the system is ON, the S3 state refers to a system state in which the system is in STANDBY, such as, for example, close your laptop without fully shutting down the system, and the S5 state refers to a system state in which the system is offline, such as, pushing the off-button on the system.

P-states or Processor Performance states enable the processor supply voltage and frequencies to be changed. Lower voltage and/or frequencies equate to lower energy consumption and degraded performance while higher voltage and/or frequencies equate to higher energy consumption and better performance.

C-states or Processor Power states are different power states a processor may enter into when idle. More power can be saved at the expense of additional latency as the C-state increases.

D-states or Device states are device specific power configurations for any other devices in the system, such as, for example, I/O (Input/Output) devices. Such I/O devices may include, but are not limited to, I/O adapter cards, external memory devices, etc.

All of the above referenced system, processor, and device states constitute a range of available power configurations that a system may be configured with to meet target power/energy budgets. Thus, embodiments of the present invention may utilize these states to provide numerous power configurations to achieve the target power/energy budget. For example, a system in an S0 state may reduce power consumption if a processor is operating at a lower voltage and frequency as a result of a P-state transition or even a C-state transition. Each possible power configuration using these states is referred to as a specific system power configuration. Based on the target energy consumption for each power domain/cluster, such as, for example, 304a, 304b, and 304c, each power domain/cluster reconfigures its power configuration to achieve the aggregate target energy budget for each interval. At the end of each interval, the local configuration server aggregates the energy consumption of the entire power domain/cluster. The error between the targeted power/energy budget and the achieved power/energy budget is determined and the subsequent target power/energy budget for the next interval is multicast to constituent nodes directly or relayed in a peer-to-peer fashion using a feedback-driven control system. Note that the sampling and control frequency may be asymmetric between the levels of the tiers or hierarchy. For example, employing a finer-grained interval, that is, shorter control interval, at the power domain/cluster level may likely improve accuracy in meeting target energy budgets, but may also increase control overhead.

Figure 4:
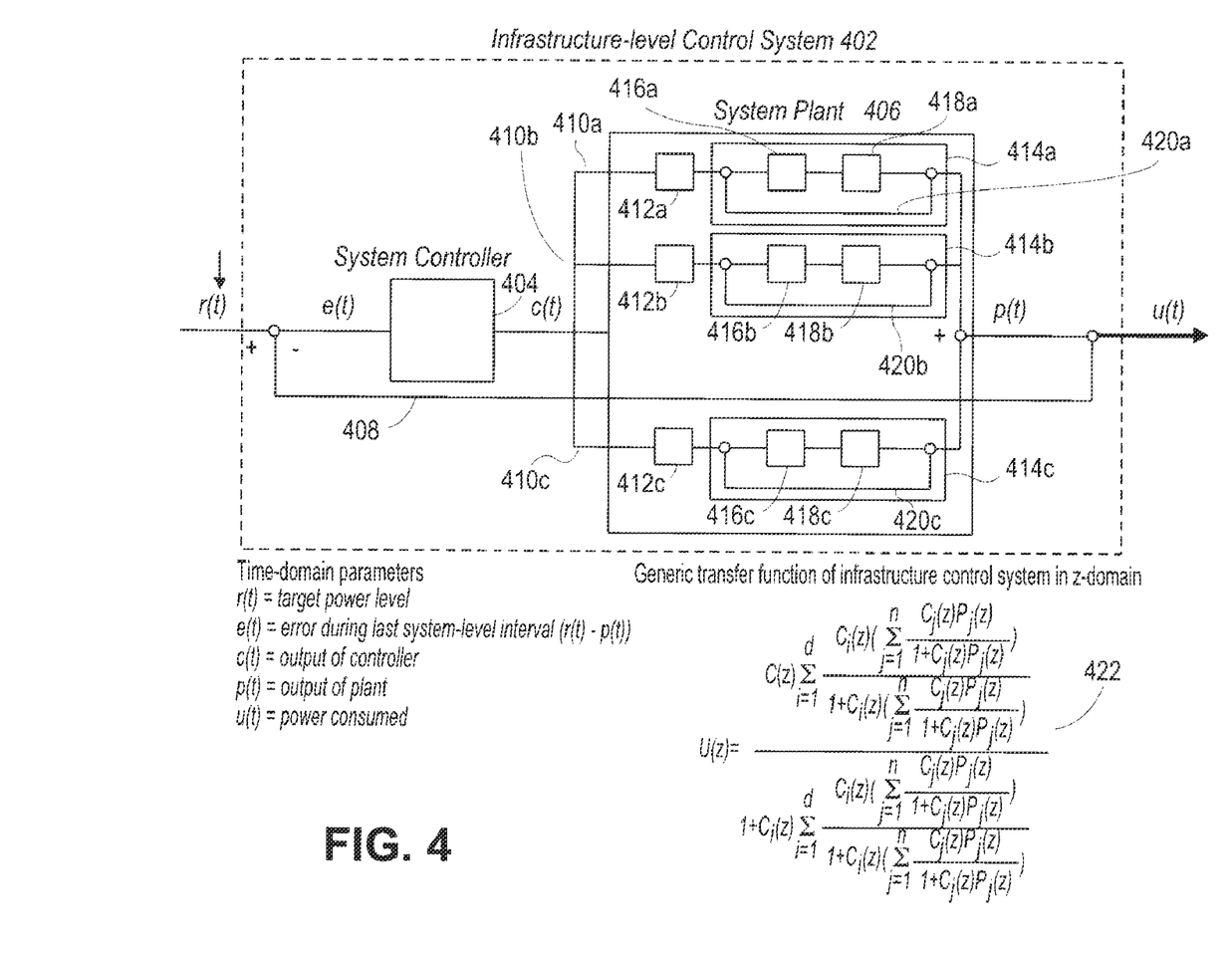
FIG. 4 is an exemplary diagram illustrating a multi-tiered control system for dynamically managing power/energy consumption for an infrastructure according to an embodiment of the present invention.

Embodiments of the present invention use a multi-tiered control system to achieve dynamically controlled energy consumption in large-scale datacenters or IT infrastructures. FIG. 4 is an exemplary diagram illustrating a multi-tiered control system 400 for dynamically managing power/energy consumption for an infrastructure according to an embodiment of the present invention. Control system 400 comprises an infrastructure-level control system 402 having a system controller 404, a system plant 406, and a feedback loop 408. System controller 404 is coupled to system plant 406, and the output of system plant 406 is fed back to system controller 404 via feedback signal 408. A system set point or energy target is configured for infrastructure-level control system 402 such that changing the maximum allowed energy consumption for infrastructure-level control system 402 only requires a single parameter.

Infrastructure-level control system 402 enables administrators to configure energy targets, which can be changed at any time. For example, if an HVAC system fails or a series of environmental control systems fail, the present invention may be used to set an artificially low energy target to ensure that the resultant thermal dissipation may be bound to avoid a thermally-induced emergency shutdown, which is not graceful and could lead to data loss.

System controller 404 manages the power configuration for infrastructure control system 402 based on the input into system controller 404. The input $e(t)$ into system controller 404 comprises the system set point input or energy target input $r(t)$ minus the output signal $p(t)$ of system plant 406 which is fed back to the input using feedback loop 408, where $p(t)$ represents the actual power consumed by system plant 406. Thus, input $e(t)$ into system controller 404 is the error signal which provides the error between the energy target input and the actual power consumed during the last system-level interval (that is, $e(t)=r(t)-p(t)$). The error signal, $e(t)$, is then used to determine an energy target input for system plant 406.

System controller 404 therefore operates to provide an optimal rate of change to achieve equilibrium, that is, an error signal, e(t), of zero (0). In other words, system controller 404 works to dissipate the error. System controller 404 may be a proportional controller, a proportional integral controller, a proportional integral derivative controller, or any other type of controller that exerts control to track a changing variable.

Output signal c(t) from system controller 404 is a control signal that is fed into system plant 406. Thus, output signal c(t) provides an input energy target into system plant 406.

System plant 406 comprises a plurality of nodes 410a, 410b, and 410c, each node including a weighting module 412a, 412b, and 412c and a corresponding individual control system 414a, 414b, and 414c. Each individual control system 414a, 414b, and 414c operates in a similar manner to infrastructure-level control system 402. Each weighting module and corresponding individual control system represents a power domain/cluster used within system plant 406. Although system plant 406 is shown as having three (3) individual control systems with domain weighting, one skilled in the relevant art(s) would know that more than 3 or less than 3 individual control systems with domain weighting may be used and that the actual number of individual control systems with domain weighting is directly correlated with the number of power domain/clusters used in the datacenter or IT infrastructure.

Domain weighting modules 412a, 412b, and 412c enable each power domain/cluster to be weighted relative to the power distributed (output power c(t)) by system controller 404 amongst all power domain/clusters. Thus, domain weighting modules 412a, 412b, and 412c provide a quality of service scheme by permitting a datacenter or IT infrastructure to favor power distribution to systems that perform some critical function. For example, power-managed domains/clusters 304a, 304b, and 304c, provide domain weighting of the total targeted power/energy using weighted multipliers of 33.33%, 13.33%, and 53.33%, respectively, as shown in FIG. 3.

The input to each individual control system 414a, 414b, and 414c is an error signal representing the weighted targeted power/energy level minus the actual power consumed by the corresponding power domain/cluster (the output of control systems 414a, 414b, and 414c), which is provided via a feedback loop. Individual control systems 414a, 414b, and 414c are used to manage the local power configuration for each power domain/cluster in the datacenter or IT infrastructure. Each of control systems 414a, 414b, and 414c comprises a local controller 416a, 416b, and 416c, a local system plant 418a, 418b, and 418c and a feedback loop 420a, 420b, and 420c. Local controller 416a, 416b, and 416c operates in a similar manner as system controller 404 described above and local system plant 418a, 418b, and 418c operates in a similar manner as system plant 406 described above. That is, control systems 414a, 414b, and 414c manage the power configuration of local system plants 418a, 418b, and 418c based on input from local controllers 416a, 416b, and 416c.

Thus, embodiments of the present invention provide individual control systems based on different scopes that are nested within, such that the local controller output of each local control system is used as input within nested control systems. At each stage of the overall control system, each level is given an energy target, which it then uses to transition the power states of specific components in all of the systems. The power state transitions at each node may be affected in numerous ways using a runtime agent. For example, this may be achieved in-band using a runtime OS (Operating System) daemon, firmware, or out-of-band through a baseboard management controller (BMC).

A generic transfer function 422 is shown to describe the interaction of the nested control systems in the z-domain with respect to the output of infrastructure-level control system 402. With embodiments of the present invention being based on formal control theory, control gains may be carefully chosen and analyzed for each of the levels, which ensure stability despite changes in the set points at each level.

Although only one level of nested control systems is shown, embodiments of the present invention are not limited to one level of nested control systems. One skilled in the relevant art(s) would know that more than one level of nested control systems may also be used without departing from the scope of the present invention.

Figure 5:
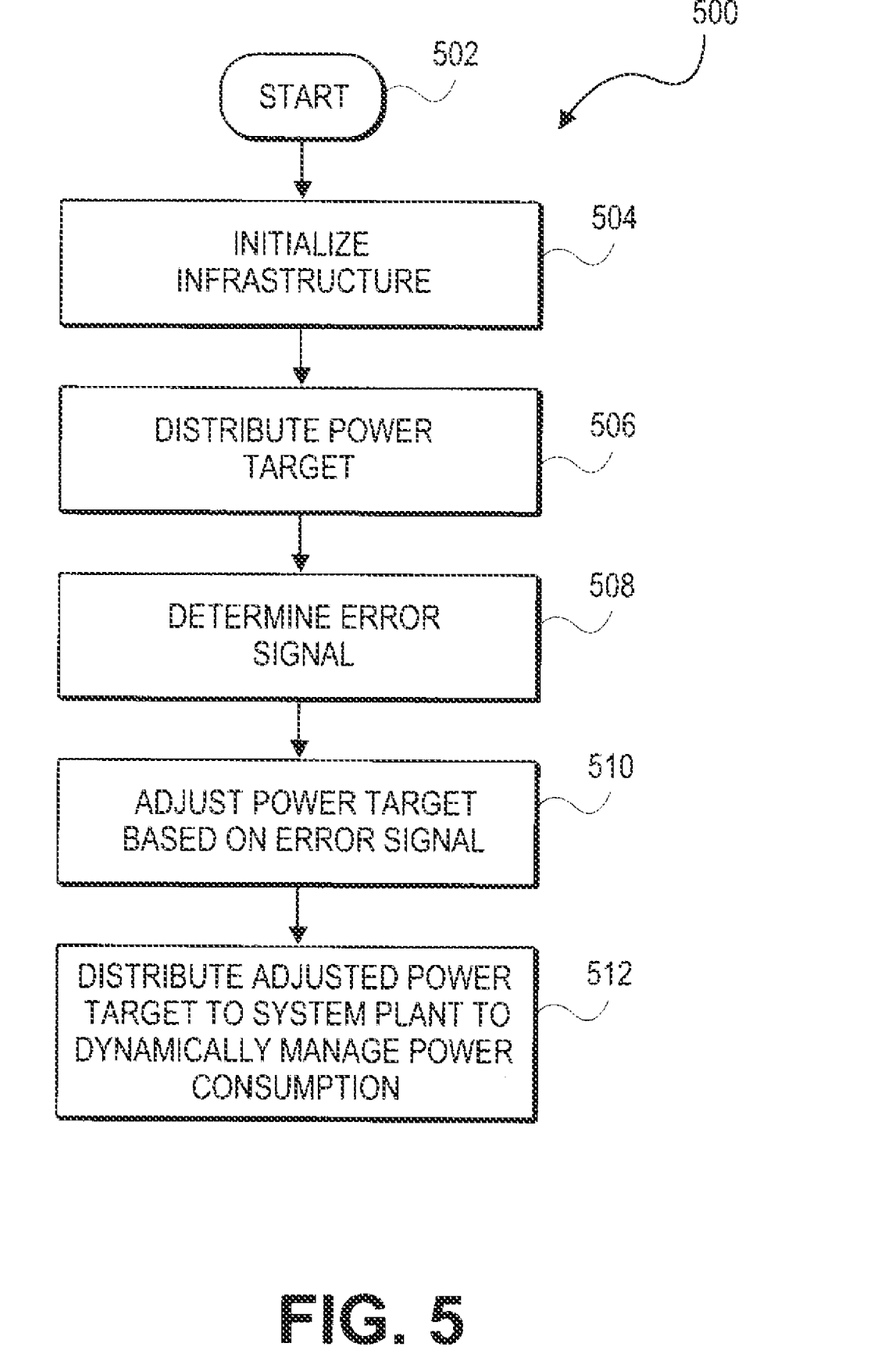
FIG. 5 is an exemplary flow diagram illustrating a method for dynamically managing power/energy consumption for an infrastructure according to an embodiment of the present invention.

FIG. 5 is an exemplary flow diagram 500 illustrating a method for dynamically managing power/energy consumption for an infrastructure according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to block 504.

In block 504, the datacenter or IT infrastructure is initialized. Initialization of the datacenter or IT infrastructure includes powering up any equipment that needs to be powered ON and enabling administrators to configure energy targets. This includes providing the domain weighting for each power-managed domain/cluster in the datacenter or IT infrastructure. This process would typically be configured by the datacenter operator (in the case of a datacenter) or a system administrator (in the case of a more general, large-scale IT deployment). Under normal conditions, once configured the system would operate autonomously. The process then proceeds to block 506.

In block 506, a set point energy target is distributed to an infrastructure-level control system for controlling power/energy consumption for the datacenter or IT infrastructure. This constitutes the primary control system. The process proceeds to block 508.

In block 508, an error signal is determined. The error signal is based upon the received set point target and an actual energy consumption of the infrastructure received during the last predetermined sampling interval. The process then proceeds to block 510.

In block 510, an adjusted energy target based on the error signal is determined. The adjusted energy target is determined by the infrastructure-level control system controller, such as, for example, system controller 404. The process then proceeds to block 512.

In block 512, the adjusted energy target or adjusted set point energy target is distributed to the system plant to enable the system plant to dynamically manage the energy consumption by transitioning the power states of specific components to meet the energy target for the system plant, and in turn, the overall infrastructure. The system plant actions are determined by the level within the hierarchy. For example, at the highest level, the plant might distribute updated policies to lower level controllers within the infrastructure. At an intermediate level within the hierarchy, the system plant might send updated policies to subsets of machines under its control based on the intersection of global policy sent by upper-level controllers and local effects, such as increased thermal load on some systems. At the lowest level of the control system, the plant would affect power state transitions to meet the policy requirements sent by mid-level controllers.

Figure 6:
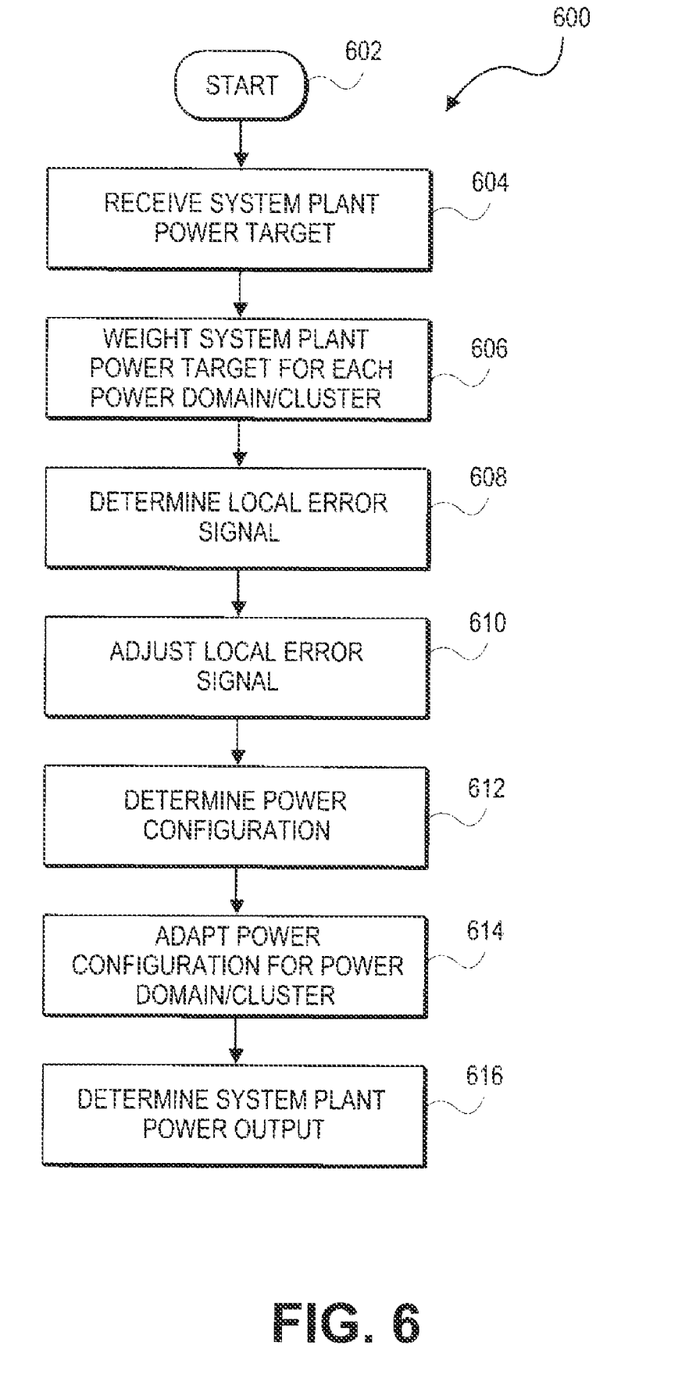
FIG. 6 is an exemplary flow diagram illustrating a method for dynamically managing power/energy consumption for a system plant according to an embodiment of the present invention.

FIG. 6 is an exemplary flow diagram 600 illustrating a method for dynamically managing power/energy consumption for a system plant according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. The process begins with block 602, where the process immediately proceeds to block 604.

In block 604, a system plant energy target is received as input. The system plant energy target is the adjusted energy target sent as output from the system controller, such as, for example, system controller 404. The process proceeds to block 606.

As previously indicated, each system plant comprises a plurality of domain weighting modules coupled to a plurality of power domain/clusters modeled as and controlled by local control systems. In block 606, the system plant energy target is weighted for each power domain/cluster in the system plant. The weighting enables each power domain/cluster to receive a portion of the system plant target set point. Such weighting policies would typically be configured by the data center operator or system administrator. The amount of system plant target set point apportioned to each power domain/cluster may vary depending on such factors as, for example, application-type, time-of-day metrics, physical locality, etc. The process then proceeds to block 608.

In block 608, a local error signal is determined by each power domain/cluster based on the weighted set point for that power domain/cluster and the power consumed by the power domain/cluster during the last interval, which is provided via a local feedback loop. The process then proceeds to block 610.

In block 610, a local system controller adjusts the local error signal to provide an optimal energy target as input for the power domain/cluster. The process then proceeds to block 612.

In block 612, a power configuration based on the energy target is determined for the power-managed domain/cluster. The process proceeds to block 614.

In block 614, the power-managed domain/cluster adapts its configuration to meet the specified energy target. In other words, the power domain/cluster uses the optimal energy target to transition the power states of specific components within its configuration. This may include adjusting power states, such as S-states, P-states, C-states, and D-states, as described above. The process then proceeds to block 616.

In block 616, the system plant power output from all of the power domain/clusters is determined. This output power is provided as the feedback loop to determine the error signal for the infrastructure.

As previously indicated, although only one level of nested control systems is shown, embodiments of the present invention are not limited to one level of nested control systems. Thus, for additional levels of nested control systems or system plants, an energy target is given at each level. The energy target is then used by each level in a similar manner as that provided above, which is to transition power states of specific components in the embedded system to meet its energy target. With embodiments of the present invention, power states may be changed at any time.

Figure 7:
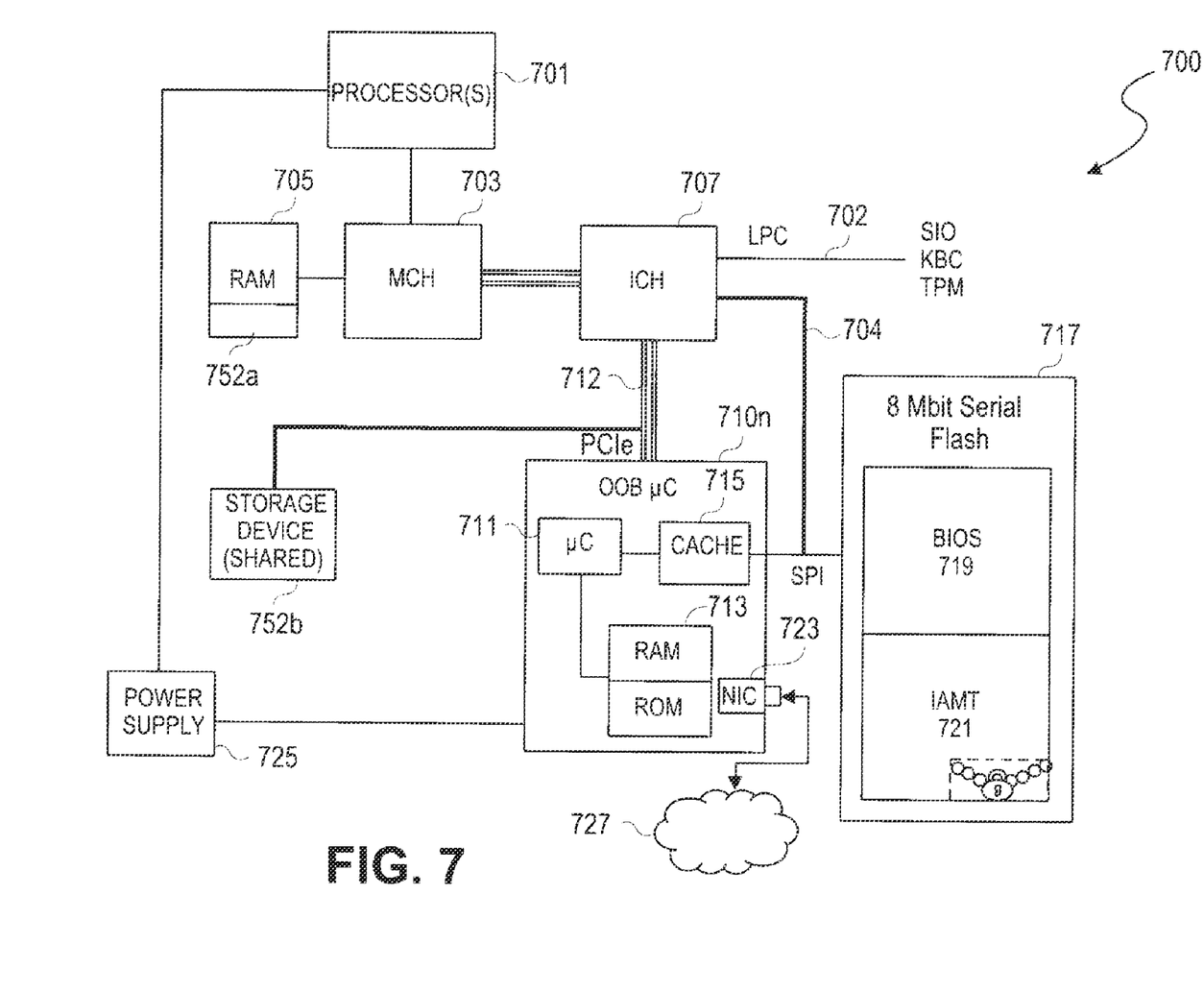
FIG. 7 is a block diagram illustrating an exemplary computer system in which aspects of described embodiments may be employed.

FIG. 7 is a block diagram illustrating an exemplary computer system in which aspects of described embodiments may be employed. A computer system 700 comprises a processor 701 (also known as an in-band processor). Processor 701 may be connected to random access memory 705 via a memory controller hub (MCH) 703. Processor 701 may be any type of processor capable of executing software, such as a microprocessor, digital signal processor, microcontroller, or the like. Although FIG. 7 shows only one such processor 701, there may be one or more processors in platform 700 and one or more of the processors may include multiple threads, multiple cores, or the like.

Processor 701 may be further connected to input/output (I/O) devices via an input/output controller hub (ICH) 707. ICH 707 may be coupled to various devices, such as, for example, a super I/O controller (SIO), a keyboard controller (KBC), and a trusted platform module (TPM) via a low pin count (LPC) bus 702. The SIO, for instance, may have access to floppy drives or industry standard architecture (ISA) devices. In an embodiment, ICH 707 is coupled to non-volatile memory via a serial peripheral interface (SPI) bus 704. The non-volatile memory may be flash memory or static random access memory (SRAM) or the like. Computer system 700 may also include an out-of-band (OOB) microcontroller 710. OOB microcontroller 710 may connect to ICH 707 via a bus 712, typically a peripheral component interconnect (PCI) or PCI express bus. OOB microcontroller 710 may also be coupled to a non-volatile memory store (NV store) 717 via SPI bus 704. NV store 717 may be flash memory or static RAM (SRAM), or the like. In many existing systems, NV store 717 is flash memory.

OOB microcontroller 710 may be operated to store a "message" containing a directive in a memory shared by OOB microcontroller 710 and processor 701. In the illustrated embodiment, processor 701 includes a shared memory 752, which is accessible by both processor 701 and OOB microcontroller 710. Shared memory 752 may reside in a reserved area 752a of RAM 705, or be located in a separate non-volatile memory store 752b, or the like. Shared memory 752 may be operated as a mailbox for these messages. Thus, in one aspect, OOB controller 710 may store a message in shared memory 752 or retrieve a message from shared memory 752 independently of the status of processor 701, including the operating system (OS) and any other programs operating on processor 701. Thus, in the illustrated embodiment, OOB microcontroller 710 may store or retrieve messages in shared memory 752 whether processor 701 is being initialized or is turned off, or whether the operating system is booting, running, crashed or otherwise. Shared memory 752 may be non-volatile (NV) memory such as flash memory or static random access memory (SRAM).

OOB microcontroller 710 operates independently of the operating system or any system start-up program, such that OOB microcontroller 710 may have its own dedicated control circuitry, firmware, operating system, etc. to control the operations of OOB microcontroller 710 independently of the status of the remainder of computer system 700. It is appreciated that the degree of operational independence of OOB microcontroller and other components may vary, depending upon the particular application.

OOB microcontroller 710 may be likened to a "miniature" processor. Like a full capability processor, OOB microcontroller 710 has a processor unit 711, which may be operatively coupled to a cache memory 715, as well as RAM (Random Access Memory) and ROM (Read Only Memory) memory 713. OOB microcontroller 710 may have an embedded network interface 723 and an independent connection to a power supply 725 to enable out-of-band communication even when in-band processor 701 is not active.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a plurality of processor cores, a storage medium readable by the processor cores (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. A system for controlling power/energy distribution comprising:
    a networked router;
    a plurality of power-managed domains/clusters coupled to the networked router; and
    a primary policy configuration and control server coupled to the networked router, the primary policy configuration and control server to distribute an energy target to each of the power-managed domains/clusters over a predetermined interval to enable each of the power-managed domains/clusters to manage its energy consumption during the predetermined interval to meet the energy target,
    wherein at the end of each predetermined interval, a local error signal based on the energy target and an achieved power consumption output of each of the power-managed domains/clusters, received through a feedback loop, is determined to provide a subsequent energy target to each of the power-managed domains/clusters for a subsequent interval.

2. The system of claim 1, wherein each of the power-managed domains/clusters comprises at least one local configuration server and a plurality of constituent nodes, each of the constituent nodes comprising servers, workstations, laptops, peripheral components, and other networked components, the at one local configuration server to receive a weighted energy target to dynamically distribute power within the plurality of constituent nodes.

3. The system of claim 1, wherein each of the power-managed domains/clusters are clustered based on at least one of: physical proximity, network distance, deployment type, and application type.

4. The system of claim 1, wherein each of the power-managed domains/clusters comprises a rack of servers in an infrastructure or datacenter, workstations, laptops, and other components.

5. The system of claim 1, wherein a power-managed domain/cluster of the plurality of power-managed domains/clusters is allocated a portion of the energy target for each predetermined interval.

6. The system of claim 1, wherein each of the power-managed domains/clusters to monitor power/energy consumption dynamically through in-band OS (operating system) daemons, firmware, or out-of-band baseboard management controllers (BMCs).

7. The system of claim 1, wherein each of the power-managed domains/clusters includes a plurality of nodes, each node including one or more components, each component including multiple power states to provide a range of available power configurations in which each of the power-managed domains/clusters utilize to meet energy targets.

8. The system of claim 1, wherein each of the power-managed domains/clusters to reconfigure its power configuration to achieve aggregate energy targets for each predetermined interval.

9. The system of claim 1, wherein the plurality of power-managed domains/clusters comprises a plurality of control systems to adjust and redistribute power, the control systems nested within an infrastructure-level control system, the infrastructure-level control system to adjust and redistribute power levels to each of the plurality of power-managed domains/clusters.

10. The system of claim 2, wherein the at least one local configuration server to transition power states for specific components within the power-managed domain/cluster to meet the weighted energy target.

11. The system of claim 7, wherein the multiple power states include S-states, P-states, C-states, and D-states.

12. A method for managing power distribution comprising:
    initializing an infrastructure;
    receiving, by an infrastructure-level control system, an energy target for an amount of power to be consumed by the infrastructure during a predetermined interval;

adapting a power configuration of the infrastructure to meet the energy target during the predetermined interval;

determining an error based on a difference between the energy target and an actual amount of power consumed by the infrastructure during the predetermined interval;

adjusting the energy target for the amount of power to be consumed by the infrastructure based on the error;

distributing the adjusted energy target to a system plant to enable the system plant to dynamically manage its power consumption during the predetermined interval by transitioning power states of specific components within the system plant to meet the adjusted energy target for the infrastructure;

determining a local error signal for the system plant based on the difference between the adjusted energy target and the actual amount of power consumed by the system plant during the predetermined interval; and providing the system plant with a subsequent energy target to enable the system plant to dynamically manage its power consumption during a subsequent predetermined interval.

13. The method of claim 12, wherein initializing an infrastructure comprises powering on components within the infrastructure and determining weighting factors for power-managed domains/clusters within the system plant.

14. The method of claim 12, wherein the error is based on the energy target and actual power consumption from a last interval for the infrastructure-level control system.

15. The method of claim 12, wherein distributing the adjusted energy target to the system plant to enable the system plant to dynamically manage its power consumption by transitioning the power states of specific components within the system plant to meet the adjusted energy target for the infrastructure comprises:

receiving the adjusted energy target; and weighting the adjusted energy target.

16. The method of claim 15, wherein determining a local error signal for the system plant based on the difference between the adjusted energy target and the actual amount of power consumed by the system plant during the predetermined interval comprises:

determining a local error based on the weighted adjusted energy target and the amount of power consumed by a plurality of power-managed domains/clusters during a last interval provided by a feedback loop;

adjusting the local error to provide an optimal energy target for each of the power-managed domains/clusters; and transitioning the power states of specific components within each of the power-managed domains/clusters to meet the optimal energy target for each of the power-managed domains/clusters.

17. The method of claim 16, further comprising:

determining an actual power-managed domain/cluster output power for each of the power-managed domains/clusters; and aggregating each of the actual power-managed domain/cluster output powers to be used as feedback for the infrastructure-level control system.

18. The method of claim 16, wherein transitioning the power states of the specific components within each of the power-managed domains/clusters to meet the optimal energy target for each of the power-managed domains/clusters comprises transitioning S-states, P-states, C-states, and D-states of the specific components.

19. At least one machine readable media comprising a plurality of instructions, that in response to being executed, result in a computing device:

clustering a first group of computing nodes of a plurality of computing nodes into a first power-managed domain of a plurality of power-managed domains, the first group of computing nodes clustered according to a deployment policy enforced in an infrastructure;

clustering a second group of computing nodes of the plurality of computing nodes into a second power-managed domain of the plurality of power-managed domains, the second group of computing nodes clustered according to the deployment policy enforced in the infrastructure;

receiving a power consumption target for the infrastructure during a predetermined interval;

weighting the power consumption target for the infrastructure according to the deployment policy to determine a first weighted energy target for the first power-managed domain and a second weighted energy target for the second power-managed domain;

determining a local error for the first power-managed domain according to a difference between an aggregate amount of power consumed by the first group of computing nodes during the predetermined interval and the first weighted energy target of the first power-managed domain for the predetermined interval;

determining a local error for the second power-managed domain according to a difference between an aggregate amount of power consumed by the second group of computing nodes during the predetermined interval and the second weighted energy target of the second power-managed domain for the predetermined interval; and determining an adjusted energy target for each of the first and second power-managed domains based on the local errors.

20. The at least one machine readable media of claim 19, wherein clustering the first and second groups of computing nodes into the first and second power-managed domains according to the deployment policy comprises clustering the first and second groups of computing nodes into first and second power-managed domains according to at least one of a deployment type of each computing node, a quality of service level to be maintained by each computing node, and a thermal risk of each computing node.

* * * * *